United States Patent
Huang et al.

(10) Patent No.: US 8,368,969 B2
(45) Date of Patent: Feb. 5, 2013

(54) METHODS AND DEVICES FOR RASTERIZING TRANSPARENT PAGES

(75) Inventors: Weiping Huang, Beijing (CN); Hao Lin, Beijing (CN); Zhangwei Meng, Beijing (CN)

(73) Assignees: Peking University Founder Group Co., Ltd, Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 718 days.

(21) Appl. No.: 12/443,431

(22) PCT Filed: Sep. 27, 2007

(86) PCT No.: PCT/CN2007/002832
§ 371 (c)(1),
(2), (4) Date: Nov. 16, 2009

(87) PCT Pub. No.: WO2008/040188
PCT Pub. Date: Apr. 10, 2008

(65) Prior Publication Data
US 2010/0053705 A1   Mar. 4, 2010

(30) Foreign Application Priority Data
Sep. 27, 2006 (CN) .......................... 2006 1 0113416

(51) Int. Cl.
*H04N 1/04* (2006.01)
(52) U.S. Cl. ......... 358/474; 358/1.15; 358/1.9; 715/276
(58) Field of Classification Search .................. 358/474, 358/1.18, 1.12, 487, 1.9, 1.15; 715/276, 715/200, 247
See application file for complete search history.

(56) References Cited

U.S. PATENT DOCUMENTS

| 6,038,033 | A * | 3/2000 | Bender et al. ................. 358/1.16 |
| 6,870,535 | B2 * | 3/2005 | Hill et al. ....................... 345/467 |
| 7,738,710 | B2 * | 6/2010 | Kliorin et al. .................. 382/232 |
| 8,073,188 | B2 * | 12/2011 | Onishi et al. ................... 382/100 |
| 2005/0206956 | A1 * | 9/2005 | Hagiwara ..................... 358/1.18 |
| 2007/0133019 | A1 * | 6/2007 | Hill et al. ........................ 358/1.9 |

FOREIGN PATENT DOCUMENTS

| CN | 1455332 A | 11/2002 |
| CN | 1621942 A | 6/2005 |
| CN | 1928852 A | 3/2007 |

\* cited by examiner

*Primary Examiner* — Negussie Worku
(74) *Attorney, Agent, or Firm* — Lathrop & Gage LLP

(57) ABSTRACT

A method for rasterizing transparent pages scans each transparent page twice. The first scanning syntactically interprets a page description file of the transparent page, divides it into page blocks, and writes information of image element objects and transparency parameters into intermediate files. The second scanning reads the image element objects and the transparency parameters from the intermediate files and builds a page bitmap in blocks. A device for rasterizing transparent pages includes interpreting, dividing, file storing and building units. The interpreting unit implements syntactical interpretation. The dividing unit divides pages into transparent and nontransparent page blocks. The building unit implements rasterization according to the transparent or nontransparent page blocks, the information of image element objects and the transparent parameters to build a page bitmap in blocks. The methods and devices herein improve the efficiency of building a page bitmap and decrease memory utilization during generation of the page bitmap.

22 Claims, 2 Drawing Sheets

METHODS AND DEVICES FOR RASTERIZING TRANSPARENT PAGES

FIELD OF THE INVENTION

The present invention relates to raster image processing techniques, more particularly, to methods and devices for rasterizing one or more transparent pages.

BACKGROUND OF THE INVENTION

The Portable Document Format (PDF) is a kind of electronic document format used to describe page contents. This format has various versions in which the most important is the PDF version 1.4. Before the PDF version 1.4 arises, a replacement model is used as the imaging model for the PDF specification. Based on the replacement model, color values in the page background are replaced by those in the current image element (such as a character, a figure and a graph) to be disposed in the page. Then, from the PDF version 1.4, a transparency model is introduced for the PDF specification. Based on the transparency model, the color values in the page background are not replaced by those in the current image element (such as a character, a figure and a graph) to be disposed in the page. Instead, a color-mixing operation is implemented by using the color values in the page background and the color values in the current image element to be disposed in the page. Then, the color values in the page background are replaced by those obtained by the color-mixing operation. By introducing the transparency model, the description capacity of the PDF file is improved significantly. For example, the PDF file is capable of supporting various special effects such as the transparency effect, the shading effect, the feathering effect and so on.

According to the PDF specification, the color-mixing transparency operation uses the following related parameters: the color values in the page background, the color values in the image element (i.e. the foreground), the contribution parameters of the image element (i.e. the Alpha parameters of the foreground), the contribution parameters of the background (i.e. the Alpha parameters of the background) and so on. When a transparency group is processed, the transparency operation further uses Shape parameters of the transparency group, the color values in an initial background of the transparency group and the contribution parameters of the initial background (i.e. the Alpha parameters of the initial background). All of the above parameters related to the color-mixing transparency operation are based on pixels. That is, the parameters of different pixels may be different from each other. Thus, all the pixels should be processed and stored individually. Moreover, the color-mixing transparency operation for each pixel should be based on at least an 8-bit depth. The bit depth is also called as pixel depth or color depth, which is used to denote how much color information can be used for displaying or printing each pixel in an image. If the bit depth is large, the information of each pixel is much, the colors available for a digital image are more, and the presented color for an image is precise. For example, a pixel with 1-bit depth has two possible values: black and white; and another pixel with 8-bit depth has 256 possible values. Thus, larger bit depth means larger amount of data. It can be seen that the color-mixing transparency operation is complicated, time-consuming and memory-consuming, especially in the case of a page including many transparency groups which are embedded with other transparency groups.

To support the transparency operation defined in the PDF version 1.4, various PDF rasterizing applications and devices (such as a reader for displaying PDF file contents, a PDF raster image processor and the like) use a method for rasterizing based on bitmap. Firstly, a file comprising PDF pages to be processed are scanned, according to the method. By judging whether the scanned file includes a transparency parameter, it can be determined which PDF page or PDF pages include one or more transparent objects. If a page is determined to include one or more transparent objects, each pixel in the page will be rasterized with the color-mixing transparency operation based on the transparency model to obtain the final 8-bit page bitmap. On the contrary, if a page is determined to include no transparent object, the page will be rasterized based on the conventional replacement model. In the method, transparency parameters are used to denote whether an image element is transparent and the transparent object refers to an object having a transparent property. A page including one or more transparent objects is called the transparent page. Since a whole page will be rasterized inseparably, the amount of data to be processed for a transparent page is very large so that the efficiency of the rasterization in this method is low.

According to another conventional method, the transparent page is rasterized in segments. Firstly, the page is divided into several page segments with a width same to the page. The page segments including no transparent object are rasterized based on the conventional replacement model to generate a page segment bitmap with an 8-bit depth. The page segments including one or more transparent objects are rasterized with the color-mixing transparency operation based on bitmap to generate a page segment bitmap with an 8-bit depth. According to this method, a page is divided into transparent page segments each including one or more transparent objects and nontransparent page segments including no transparent object. Then, the page is rasterized in segments. This method is better than the previous method. Since the speed of rasterizing a nontransparent page segment based on the replacement model is higher than that of rasterizing a transparent page segment based on the transparency model, the efficiency of the rasterization in this method is improved for a transparent page whose transparent objects are disposed in some of the segments.

However, the method also has some disadvantages. Each of the page segments has a width same to that of the page. Where a transparent object overlaps with the page in a whole height of the page, all of the page segments are transparent page segments. Thus, all pixels in the whole page should be processed with the color-mixing transparency operation based on the transparency model. Furthermore, during rasterization, it should store the page segment gray bitmaps of all color plates and the Shape and Alpha parameters of each pixel in all of the page segments. Each of the parameters should be presented by an 8-bit bitmap due to the color-mixing transparency operation. It can be seen that the method for rasterizing a page in segments is also memory-consuming, especially in the case of a rasterizing output device with a high resolution. For example, when a PDF page with A3 size is output by a phototypesetting device with an output resolution of 2,400 DPI, the amount of data of six page bitmaps for the Cyan, Magenta, Yellow and Black color plates and the Shape and Alpha parameters is up to 6 G bytes. Then, any operation (e.g. one clear operation) for a bitmap buffer of the page is time-consuming during the rasterization. Although the method for rasterizing a page in segments does not need to buffer all of the page segment bitmaps, the amount of image elements to be processed from different segments is increased so as to impact the efficiency of the rasterization.

It can be seen that the amount of data to be processed is very large according to the conventional methods for rasterizing based on bitmap. The methods are memory-consuming and the efficiency of the rasterization is very low.

SUMMARY OF THE INVENTION

It is to provide a method and device for rasterizing a transparent page to improve the efficiency of the rasterization.

According to an aspect of the present invention, a method for rasterizing a transparent page comprises syntactically interpreting a page description file of the transparent page, dividing the page into page blocks, and writing information of image element objects and transparency parameters generated by the interpreting into intermediate files; and orderly reading the image element objects and the transparency parameters out of the intermediate files and building a page bitmap in blocks.

In an implementation, the step of dividing the page into page blocks further comprises: dividing the page into a plurality of page blocks with a same size. A width of the page blocks is m×8 pixels and a height of the page blocks is n×8 pixels, m=1, 2, 4, 8 and n=1, 2, 4, 8.

According to another aspect of the present invention, a device for rasterizing a transparent page comprises an interpreting unit, a dividing unit, a file storing unit and a building unit, wherein the interpreting unit is used to syntactically interpret a page description file of the transparent page and provide a result of interpretation for the dividing unit; the dividing unit is used to divide the page into transparent page blocks and nontransparent page blocks according to the result of interpretation and provide dividing information for the building unit; the file storing unit is used to store information of image element objects and transparent parameters generated by using syntactic analysis and provide the information of the image element objects and the transparent parameters for the building unit; and the building unit is used to implement rasterization according to the transparent or nontransparent page blocks, the information of image element objects and the transparent parameters so as to build a page bitmap in blocks.

By dividing a page into a plurality of page blocks, transparent areas and nontransparent areas in the page can be distinguished so as to minimize the portions to be rasterized based on the transparency model. In this way, the amount of data during rasterization is reduced and the efficiency of rasterization is improved significantly.

DESCRIPTION OF THE PREFERRED EMBODIMENTS

Figure 1:
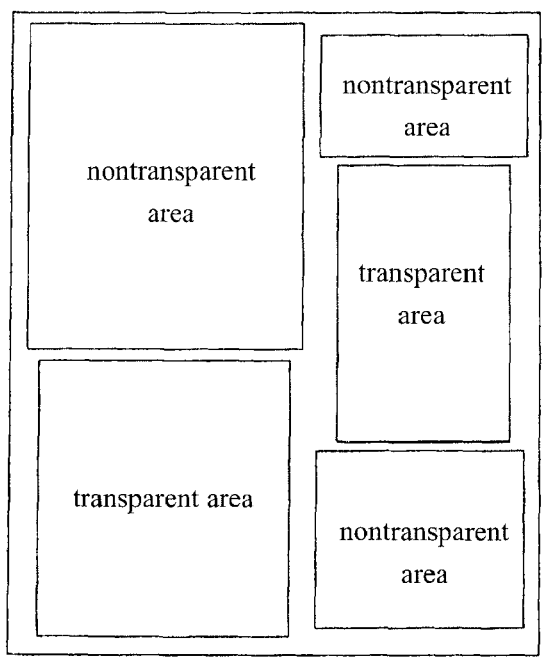
FIG. 1 is a diagram illustrating a page including transparent and nontransparent objects.

FIG. 1 shows a transparent page including transparent and nontransparent objects. Typically, a transparent object or transparent objects only occupy a portion of a page, as shown in FIG. 1. Thus, the conventional method for rasterizing a whole page or a page segment based on the transparency model is not economical or efficient. According to the present invention, a transparent page is divided into transparent areas and nontransparent areas for rasterization. The transparent and nontransparent areas are rasterized based on the transparency model and replacement model, respectively. In this way, only the transparent areas are needed to be rasterized based on the transparency model so as to decrease the amount of data generated by the rasterization based on the transparency model and thus improve the efficiency of the rasterization.

According to the present invention, a transparent page is scanned twice. During the first scanning, a page description file (such as a PDF file, XML Paper Specification (XPS) file, etc) of the transparent page is interpreted syntactically. Although the PDF file and the XPS file describes a page in different manners, the page contents described in each of the files can be analyzed into a plurality of image element objects such as character objects, figure objects, graph objects, transition objects, and a combination thereof, by using respective syntactic analysis. Furthermore, color parameters, transparency-related parameters and other information corresponding to these image element objects can be obtained by syntactical interpretation. Then, all the generated information of the image element objects and the transparency parameters are written into intermediate files so as to be the input during the second scanning. At the same time, the page is divided into a plurality of page blocks with the same size. Each of the page blocks is determined as a transparent page block or a nontransparent page block according to the syntactical interpretation. During the second scanning, the image element objects and the transparency parameters are read out of the intermediate files orderly and the page bitmap are built in blocks. Transparency parameters are parameters specifying whether an image element is transparent. All the intermediate files can be stored in a memory buffer. Alternatively, some of the intermediate files can be stored in the memory buffer and the other can be stored in an external storage. To decrease the memory occupancy during the second scanning, the process of building a page in blocks stated above is on the basis of the process of building a page in segments. During a page segment bitmap is built, only the image element objects overlapping with the current segment are considered and all the image element objects which do not overlap with the current segment are not related.

Hereinafter, the method for dividing a page into page blocks and forming the page bitmap will be described in detail.

According to an embodiment of the present invention, a page can be divided into a plurality of page blocks with the same size. The size of the page blocks can be determined according to the resolution of the used rasterization device. Typically, the width and height of a page block can be limited to m×8 pixels and n×8 pixels, respectively, wherein m and n are integers. Preferably, m=1, 2, 4, 8 and n=1, 2, 4, 8. Then, the width of each page block is 64, 32, 16 or 8 pixels and the height of each page block is 64, 32, 16 or 8 pixels. More preferably, m=4 and n=4. Then, the size of a page block is 32×32 pixels. Each page block has the following properties: the type of the page block, gray values, and index information corresponding to the page block bitmap. The page block bitmap is stored in a bitmap buffer.

From what stated above, the page contents are analyzed into a plurality of image element objects. In the process of rasterizing a page, the plurality of image element objects are disposed in the page based on the required imaging model (e.g. the replacement model and the transparency imaging model) according to a certain sequence so as to generate a page bitmap. The characters, figures and other image elements in the page can be obtained from the information of the image element objects. Thus, corresponding to the division for the page, an image element to be disposed in the page is divided into a plurality of image element blocks according to a bounding BOX (BBOX) for the image element. The method for dividing an image element into image element blocks is similar to that for dividing a page into page blocks. The size of the image element blocks can be the same. Preferably, the size of an image element block is equal to that of a page block. For example, the width of each image element block can be 32, 16 or 8 pixels and the height of each image element block can be 32, 16 or 8 pixels.

Figure 2:
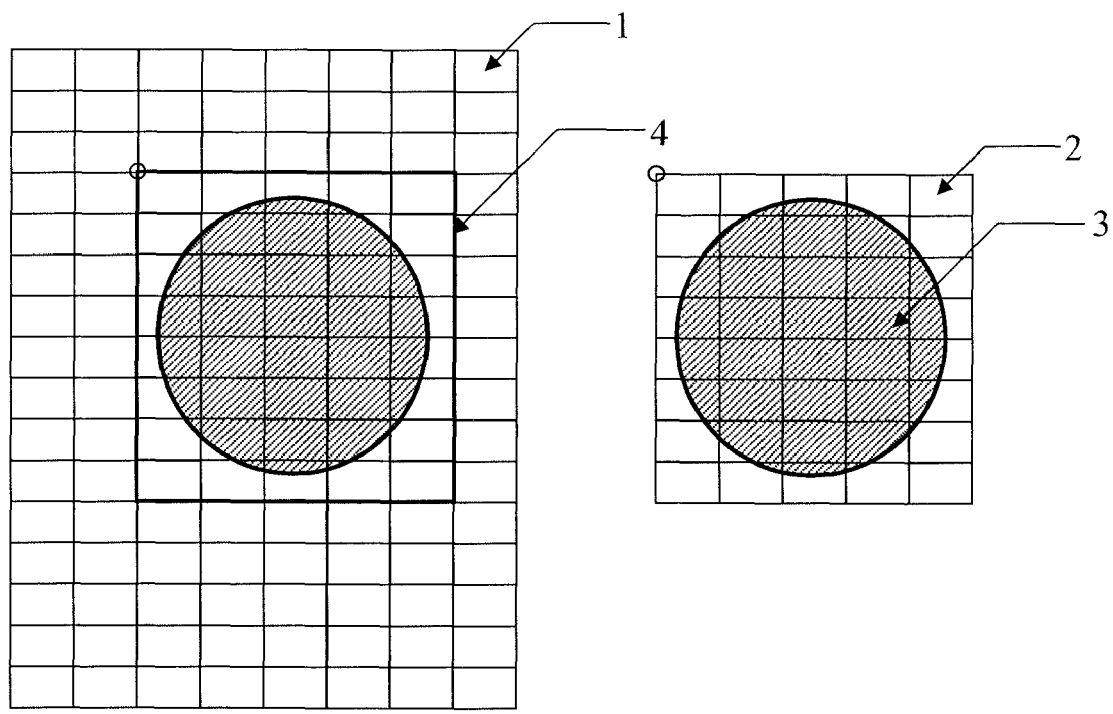
FIG. 2 is a diagram illustrating the division for a page and an image element.

FIG. 2 shows a method for dividing a page and an image element. As shown in FIG. 2. the page is divided into a plurality of page blocks 1 with the same size. During the image element 3 is disposed in the page, the image element 3 is correspondingly divided, according to its bounding box 4, into a plurality of image element blocks 2 having the same size and corresponding to the page blocks 1. It can be seen that the page blocks are changed dynamically, i.e., the page blocks are updated by disposing image element blocks. The image element blocks are media in the process of updating the page blocks.

According to the transparency parameters, each page block can be determined as a transparent page block or a nontransparent page block. The so-called transparent page block is a page block including a transparent object or transparent objects and the so-called nontransparent page block is a page block including no transparent object. The method for determining a page block as a transparent page block or nontransparent page block comprises the following steps. Firstly, it is to judge whether the current image element in the page blocks is transparent. On the one hand, if the current image element is transparent, all the page blocks corresponding to the bounding box of the current image element are determined to be transparent page blocks. On the other hand, if all image elements overlapping with a page block are nontransparent, the page block is a nontransparent page block. Each page block can be determined as a transparent page block or nontransparent page block by syntactically interpreting the page description file.

From what stated above, during the second scanning, the image element objects and the transparency parameters are read out of the intermediate files orderly and the page bitmap are built in blocks. In the method for building the page bitmap in blocks, the transparent page blocks are rasterized based on the transparency model and the nontransparent page blocks are rasterized based on the replacement model so as to build the page bitmap.

Since a page generally includes a plurality of image elements overlapping in a certain sequence, the image elements are disposed in the page in a certain sequence. That is, image element blocks from various image elements may be disposed in a certain page block orderly. During the image element blocks are disposed, it is needed to determine whether the image element blocks are needed to be processed with the mixing transparency operation according to the transparency property or the nontransparency property of the image element blocks. Moreover, an optimum process can be implemented according to the original type of the page blocks and the type of the current image element blocks. Where the current image element blocks are nontransparent, the corresponding original page blocks are replaced by the current image element blocks based on the replacement model so as to form updated page blocks. Where the image element blocks to be disposed are transparent, the optimum process can be implemented. For example, in a possible case, during an image element is disposed in page blocks, a certain image element block is determined to be processed with the mixing transparency operation according to the transparent parameters of the image element. However, the final type of the corresponding page block is determined as a nontransparent page block according to the syntactical interpretation. Then, since this page block will be replaced by the final corresponding image element block, the mixing transparency operation can be omitted. The final page bitmap in this page block can be obtained by the final rasterization based on the replacement model. That is, where the final type of a page block is determined as a nontransparent page block according to the syntactical interpretation and the current image element block to be disposed in the corresponding page block is transparent, the process for the current image element block is omitted. In this way, unnecessary intermediate processes can be omitted so as to decrease the amount of data to be processed.

Figure 3:
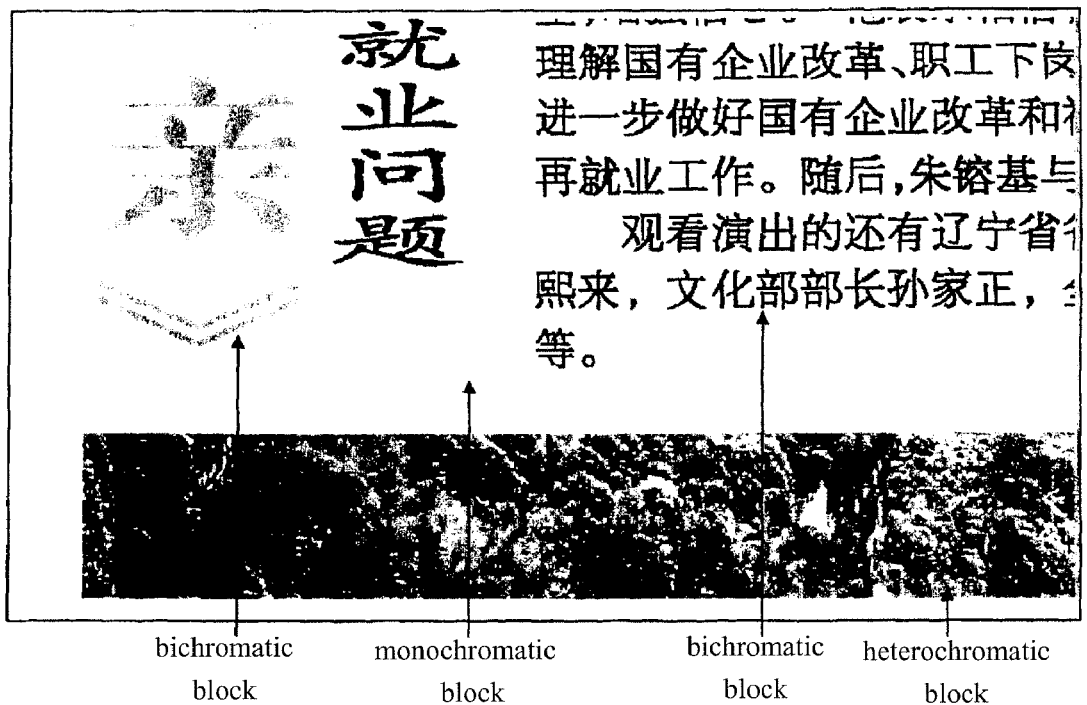
FIG. 3 is a diagram illustrating a page divided.

According to an embodiment of the present invention, during the page bitmap are built, the transparent page blocks can be further distinguished into two types: the transparent monochromatic block and transparent heterochromatic block. On the one hand, the transparent monochromatic block means that all the pixels in the page block have the same gray value. On the other hand, the transparent heterochromatic block means that the pixels in the page block have various gray values, as shown in FIG. 3. The transparent heterochromatic block can be rasterized based on the transparency model so that the gray value of each pixel therein can be presented by a flat bitmap.

Similarly, the nontransparent page blocks can be further distinguished into three types: the nontransparent monochromatic block, nontransparent bichromatic block and nontransparent heterochromatic block, as shown in FIG. 3. The nontransparent monochromatic block means that all the pixels in the page block have the same gray value. The nontransparent bichromatic block means that the pixels in the page block have two different gray values. Thus, it needs only one bit to present the gray value of each pixel in the nontransparent bichromatic block. Where the page block bitmap is 8-bit, the amount of data of the gray values in the nontransparent bichromatic block can decreases to ⅛ of the original amount. The nontransparent heterochromatic block means that the pixels in the page block have at least three different gray values. The nontransparent heterochromatic block can be rasterized based on the replacement model so that the gray value of each pixel therein can be presented by a flat bitmap.

By the further division stated above, it can further improve the efficiency of building the page bitmap and decrease the memory occupancy. For example, where the current page block and the image element block to be disposed in the current page block are all transparent monochromatic blocks, due to the same condition for all the pixels in the block, it needs to implement the color-mixing transparency operation only once rather than implementing the color-mixing transparency operation pixel by pixel so as to decrease the workload significantly. Furthermore, where an image element block to be disposed in the current page block is a nontransparent monochromatic block, the process of replacement is implemented based on the replacement model without needing the flat bitmap buffer. Where an image element block to be disposed in the current page block is a nontransparent bichromatic block, it needs only ⅛ of the flat bitmap buffer required in the conventional method.

It can be understood that the method for dividing page blocks stated above is just an illustrative implementation. The skilled in the art can divide page blocks in another manner in practice. For example, the transparent page blocks can further comprise transparent bichromatic blocks whose pixels have two different gray values. Various methods for dividing page blocks are similar to each other, which will not be described in detail hereinafter.

According to another embodiment of the present invention, image element blocks can be distinguished into three types: black blocks, white blocks and mixed blocks, based on the information of the image element object. The black block means that the gray value of each pixel in the image element block is 1. The white block means that the gray value of each pixel in the image element block is 0. The image element blocks other than the white and black blocks are mixed blocks and presented by black-white bitmaps. For the black-white bitmaps of the image element blocks, a sequence of the image element blocks can be compressed in a run-length coding manner so as to improve the efficiency. It is known to the skilled in the art that the "black" and "white" mentioned above do not refer to the colors of black and white but mean whether a pixel is occupied by a certain color. The specific color depends on color parameters.

The figure image elements, transition image elements and the like are processed as mixed blocks and presented by a flat bitmap.

For displays, color printers, phototypesetting devices and other output devices, the color in a page is formed by a plurality of color plates. For example, a bitmap of a page in a phototypesetting device consists of four page bitmaps of four color plates (a cyan plate, magenta plate, yellow plate and black plate). Furthermore, during the intermediate transparency process, two page bitmaps for Shape parameters and Alpha parameters are needed according to the transparency model. An 8-bit page bitmap corresponding to each of the four color plates and the Shape and Alpha parameters uses the method for dividing blocks stated above. That is, the 8-bit page bitmap is divided into blocks with the same size. For example, the width of each block can be 32, 16 or 8 pixels and the height of each block can be 32, 16 or 8 pixels.

The above method also can be used for the transparency group. Specifically, the transparency group can be regarded as a sub-page and rasterized in blocks. The result of rasterization in blocks is disposed in the corresponding parent page.

Figure 4:
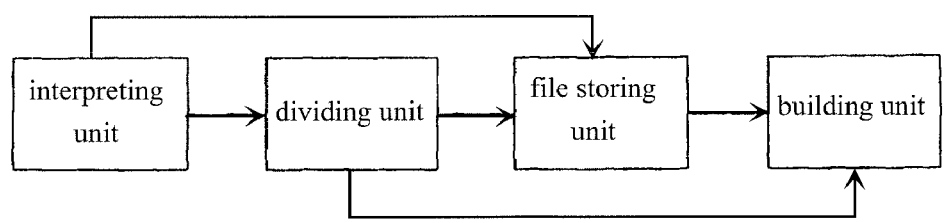
FIG. 4 is a diagram illustrating a device for rasterizing transparent pages according to the present invention.

FIG. 4 shows a device for rasterizing transparent pages according to the present invention, which comprises an interpreting unit, a dividing unit, a file storing unit and a building unit. The interpreting unit is used to syntactically interpret a page description file of a transparent page and provide the result of interpretation for the dividing unit. The dividing unit is used to divide the page into transparent and nontransparent page blocks according to the result of interpretation and provide the dividing information for the building unit. The file storing unit is used to store information of image element objects and transparent parameters generated by using the syntactic analysis and provide the information of image element objects and transparent parameters for the building unit. The building unit is used to implement rasterization according to the transparent or nontransparent page blocks, information of image element objects and transparent parameters so as to build a page bitmap in blocks.

By using the methods stated above, the dividing unit divides the page into transparent and nontransparent page blocks and the building unit builds a page bitmap in blocks, the process of which will not be described in detail hereinafter.

The above methods for rasterizing are suitable not only for the transparent pages described by a PDF file but also for the transparent pages described by any other language file such as the XPS file.

According to the present invention, a transparent page will be scanned twice. During the first scanning, the page description file of the transparent page is interpreted syntactically, the page is divided into a plurality of page blocks, and information of the image element objects and the transparency parameters are written into the intermediate files. During the second scanning, the image element objects and the transparency parameters are read out of the intermediate files orderly and a page bitmap is built in blocks. Compared with the conventional methods for reaterization, the methods according to the present invention have at least one of the following advantages.

Firstly, by using one of the methods according to the present invention, the memory occupancy during the building of the page bitmap can be decreased effectively. For example, the nontransparent monochromatic blocks do not need any flat bitmap buffer and the nontransparent bichromous blocks need only ⅛ of the flat bitmap buffer required in the conventional method. Furthermore, the nontransparent page blocks can be rasterized without needing the consideration of the bitmap buffer related to the transparent parameters.

Secondly, by using one of the methods according to the present invention, the efficiency of building a page bitmap can be improved effectively. In the conventional method for rasterization, all pixels in each page or page segment including one or more transparent objects should be processed pixel by pixel with the color-mixing transparency operation. However, according to the present invention, the page can be divided into a plurality of small page blocks and the objects can be classified to transparent and nontransparent objects. The portion of the page bitmap corresponding to a nontransparent page block can be built directly based on the replacement model. Only the portion of the page bitmap corresponding to the transparent page blocks are needed to be built orderly based on the transparency model. Moreover, where a transparent page block related to the transparency parameters is a transparent monochromatic block, it needs to implement the color-mixing transparency operation only once for the transparent page block without implementation of the color-mixing transparency operation pixel by pixel.

Thirdly, by using one of the methods according to the present invention, the obtained page bitmap is described in blocks so as to improve the efficiency of subsequent processes (such as the color correction and screening) for the page bitmap since the pixels need not to be processed one by one in the subsequent processes. For example, all pixels in a monochromatic block can be color-corrected only once instead of corrected pixel by pixel. Furthermore, a bichromous block needs only two color corrections.

Finally, data of the page bitmap generated according to the present invention is compressed, which is advantageous for the data transmission in a system and the data output from an output device. For example, the data of the portion of the page bitmap corresponding to the monochromatic and bichromous blocks is compressed. In practice, the bitmap data corresponding to the bichromous and heterochromatic blocks as well as a table describing the blocks can also be compressed so as to further decrease the amount of data of the page bitmap in blocks.

The present invention is not limited to the descriptions and embodiments mentioned above. Variations and modification made by those skilled in the art according to the disclosure herein should be within the scope of the present invention.

The invention claimed is:

1. A method for rasterizing a transparent page, comprising:
   syntactically interpreting, using an interpreting unit, a page description file of the transparent page to identify a plurality of image element objects in the page and a plurality of transparency parameters of the image element objects; dividing, using a dividing unit, the page into page blocks writing, using a file storing unit, information of image element objects and transparency parameters into medium files of a memory; and orderly reading, using a building unit, the information of the image element objects and the transparency parameters out of the medium files; and building a page bitmap according to the page blocks.

2. The method of claim 1, wherein the step of dividing the page into page blocks further comprises:

dividing the page into a plurality of page blocks with a same size, using the dividing unit.

3. The method of claim 2, wherein the step of building a page bitmap in blocks further comprises:

using the building unit, rasterizing the transparent page blocks based on a transparency model to build the page bitmap; and using the building unit, rasterizing the nontransparent page blocks based on a replacement model to build the page bitmap.

4. The method of claim 3, wherein, in the step of building a page bitmap according to the page blocks, if a page block is determined as a nontransparent page block according to a result of the interpreting, all of transparent image element blocks to be disposed in the page block are not processed.

5. The method of claim 3, wherein the step of building a page bitmap according to the page blocks further comprises the building unit distinguishing the transparent page blocks into:

transparent monochromatic blocks in which all of pixels have a same gray value; and transparent heterochromatic blocks in which the pixels have various gray values.

6. The method of claim 3, wherein the step of building a page bitmap according to the page blocks further comprises the building unit distinguishing the nontransparent page blocks into:

nontransparent monochromatic blocks in which all of pixels have a same gray value;

nontransparent bichromatic blocks in which the pixels have two different gray values; and nontransparent heterochromatic blocks in which the pixels have more than two different gray values.

7. The method of claim 2, wherein a width of the page blocks is m×8 pixels and a height of the page blocks is n×8 pixels, m=1, 2, 4, 8 and n=1, 2, 4, 8.

8. The method of claim 2, wherein, in the step of dividing the page into page blocks, each page blocks comprises following properties: a type of the page block, gray values, and index information corresponding to a page block bitmap of the page block.

9. The method of claim 1, wherein a width of the page blocks is m×8 pixels and a height of the page blocks is n×8 pixels, m=1, 2, 4, 8 and n=1, 2, 4, 8.

10. The method of claim 1, wherein, in the step of dividing the page into page blocks, each page block comprises the following properties: a type of the page block, gray values, and index information corresponding to a page block bitmap of the page block.

11. The method of claim 1, wherein the step of dividing the page into page blocks further comprises:

using the dividing unit, determining whether an image element to be disposed in a page block is transparent, wherein if the image element is transparent, each of the page blocks corresponding to a bounding box of the image element is determined as a transparent page block; and if each image element overlapping with a page block is nontransparent, the page block is determined as a nontransparent page block.

12. The method of claim 11, wherein the step of building a page bitmap in blocks further comprises:

using the building unit, rasterizing the transparent page blocks based on a transparency model to build the page bitmap; and using the building unit, rasterizing the nontransparent page blocks based on a replacement model to build the page bitmap.

13. The method of claim 12, wherein the step of building a page bitmap according to the page blocks further comprises the building unit distinguishing the transparent page blocks into:

transparent monochromatic blocks in which all of pixels have a same gray value; and transparent heterochromatic blocks in which the pixels have various gray values.

14. The method of claim 12, wherein, in the step of building a page bitmap according to the page blocks, if a page block is determined as a nontransparent page block according to a result of the interpreting, all of transparent image element blocks to be disposed in the page block are not processed.

15. The method of claim 12, wherein the step of building a page bitmap according to the page blocks further comprises the building unit distinguishing the nontransparent page blocks into:

nontransparent monochromatic blocks in which all of pixels have a same gray value;

nontransparent bichromatic blocks in which the pixels have two different gray values; and nontransparent heterochromatic blocks in which the pixels have more than two different gray values.

16. The method of claim 1, wherein the step of building a page bitmap according to the page blocks further comprises:

using the dividing unit, dividing each of the image element objects respectively corresponding to characters and figures in the page into a plurality of image element blocks with a same size; and using the interpreting unit, distinguishing the image element blocks into:

black blocks in which the gray value of each pixel is 1, white blocks in which the gray value of each pixel is 0, and mixed blocks other than the black blocks and white blocks; and using the building unit. presenting gray values of all the pixels in the black blocks, white blocks and mixed blocks by a black-white bitmap.

17. The method of claim 16, wherein, in the black-white bitmap, a sequence of the image element blocks is compressed in a run-length coding manner.

18. The method of claim 1, wherein the step of building a page bitmap according to the page blocks further comprises:

using the building unit, processing image element objects respectively corresponding to images and transitions in the page as mixed blocks; and using the building unit, presenting a gray value of each pixel in the mixed blocks by a flat bitmap.

19. The method of claim 1, wherein the step of building a page bitmap in blocks further comprises:

using the building unit, rasterizing a transparency group in blocks; and using the building unit, disposing a result of the rasterizing in blocks to a corresponding parent page.

20. The method of claim 1, wherein the step of building a page bitmap according to the page blocks further comprises:

using the dividing unit, dividing each of page bitmaps corresponding to Shape parameters and contribution parameters of pixels in the page into blocks with a same size.

21. The method of claim 1, wherein the page description file is a PDF file or an XPS file.

22. A device for rasterizing a transparent page, comprising an interpreting unit, a dividing unit, a file storing unit and a building unit, wherein the interpreting unit is used to syntactically interpret a page description file of the transparent page and provide a result of interpretation for the dividing unit;

the dividing unit is used to divide the page into transparent page blocks and nontransparent page blocks according to the result of interpretation and provide dividing information for the building unit;

the file storing unit is used to store information of image element objects and transparent parameters generated by using syntactic analysis and provide the information of the image element objects and the transparent parameters for the building unit; and the building unit is used to implement rasterization, according to the transparent or nontransparent page blocks, the information of image element objects and the transparent parameters, so as to build a page bitmap in blocks.

* * * * *